April 20, 1965 J. PERILHOU ETAL 3,179,572
FUEL ELEMENTS FOR USE IN NUCLEAR REACTORS
Filed March 28, 1961
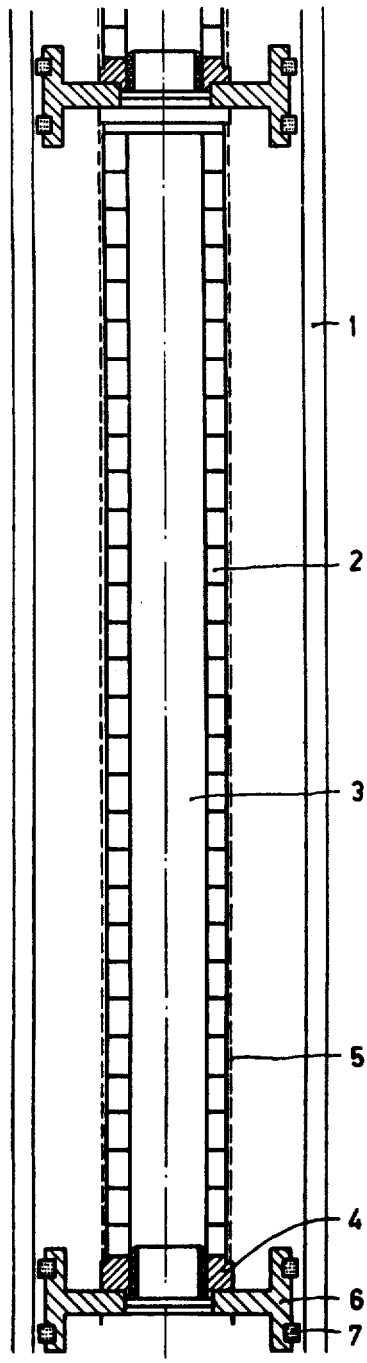
INVENTOR
JEAN PERILHOU
GEORGES LE GARGASSON
BY
AGENT United States Patent Office 3,179,572
Patented Apr. 20, 1965

3,179,572
FUEL ELEMENTS FOR USE IN
NUCLEAR REACTORS
Jean Perilhou, Bourg-la-Reine, and Georges Le Gargasson, Paris, France, assignors to North American Philips Company, Inc., New York, N.Y., a corporation of Delaware
Filed Mar. 28, 1961, Ser. No. 98,966
Claims priority, application France, Apr. 4, 1960, 823,313
5 Claims. (Cl. 176—73)

The invention relates to a fuel element for use in nuclear reactors, which element consists of a sheath inside which the fissile material is arranged.

It is known to use material for the sheath of fuel elements having at the same time a section which prevents most of the neutrons travelling towards the fuel from escaping through the sheath, and being capable of producing a maximum transfer of the heat developed by the fission from the fuel towards the outer side of the envelope and, moreover not being attacked physically by neutrons. The sheath separates the coolant from the fuel and prevents the fuel from chemically reacting with the coolant and adsorption of neutrons by the coolant.

Although it is important to provide a maximum metallic engagement between the fuel and the sheath, since the heat transfer is performed by thermal conduction, it often occurs that during the fission of the fuel a change in the metallic engagement occurs owing to the deformation of the contacts between the sheath and the fuel, so that the transfer of heat of fission towards the coolant is affected adversely. In such cases it is advisable to build up the fuel element so that the fuel does not come into contact with the sheath. The heat transport then occurs by radiation, to which end a particular embodiment of the sheath is necessary.

The fissile material may be provided in the sheath in different shapes.

Fissile material in the form of compact bodies has the advantage that the bodies can be obtained in a simple manner by pressing and if desired sintering, whereas crucibles required for fissile material in the form of grains or powder can be dispensed with. These crucibles constitute the intermediate partitions, which affect inter alia the heat transfer. Such crucibles are to be made from graphite with a view to the material contained therein.

When using compact bodies certain problems arise. Due to the neutron flux and to the sequence of thermal cycles the compact bodies are likely to break down soon, so that their mechanical equilibrium and hence the action of the reactor are endangered.

The fuel elements according to the invention mitigate these disadvantages. In accordance with the invention the fissile material provided in the form of compact bodies inside the sheath, without being in contact herewith, is surrounded by a coating of a refractory, perforated material or by a material shaped in the form of a metallic, refractory grating, the latter material not reacting chemically with the fuel. Thus the coating provided between the fuel and the sheath is restricted to a surface which is small as compared with that of the fuel, so that the thermal efficiency of the reactor can be increased.

In a particular embodiment the compact bodies are shaped in the form of a ring. In this case the fuel rings are piled on a central support. Although this central support serves in the first place to pile up the fuel rings, it may be constructed in a form such that it also holds the coating surrounding the fuel rings. The central support and the coating are then rigidly connected with each other.

The central support may be constructed in the form of a pile of several mandrels, separated by adjusting rings. Each mandrel is formed by a cylinder, onto the ends of which two supporting nuts are screwed, of which the outer diameter exceeds that of the metallic, refractory coating, which is thus held in place between the said nuts.

The materials chosen may be such that the mandrels are capable of reacting chemically with the fuel or with the metallic, refractory coating. The mandrels are then coated with a film of a suitable, refractory material.

The heat transfer from the fuel to the sheath is performed by radiation. This way of heat transfer has furthermore the advantage that no gas bubbles are produced on the outer surface of the sheath, which may occur with heat transfer by conduction, which bubbles also affect adversely the conduction of the fission heat to the outer side. At is important that the sheath should be pervious to infrared radiations. To this end use may be made particularly of quartz and other silicone compounds. These materials also have a section for trapping neutrons and preventing them from escaping through the sheath and they are physically not affected by neutrons. With quartz, for example, the active section is lower than 0.10 barn.

With the construction described of the fuel elements a higher temperature may be allowed for the fission of the fuel. This has the advantage that the temperature of the coolant is raised, which involves an increase in thermal efficiency. To this end the device is arranged so that means are provided between the inner surface of the sheath and the corresponding outer surface of the coating of the fuel, which means hold the said outer surface spaced apart from the said inner surface and are in contact with each of the surfaces only partly. These means may be constituted by adjusting rings, for example of alumina. The adjusting rings prevent weakening and melting of the sheath, since they produce a temperature gradient between the mandrels and the said sheath. They are arranged inside the sheath with a certain amount of play in order to take the expansion into account. Since nevertheless the amount of play is small, it is necessary to take measures tending to absorb shocks which may occur between the adjusting rings and the sheath. The outer surface of the adjusting rings opposite the sheath is profiled to this end so that coils of quartz fibre can be wound thereon. If the coils are wound irregularly and loosely, they have adequate elasticity to absorb any shocks between the adjusting rings and the sheath.

The invention will now be described more fully with reference to the figure, which is a cross sectional view of a fuel element.

The fuel element comprises an envelope or sheath 1, made from a material such as quartz, in order to allow a suitable transfer of the infrared radiations emitted by the heat released by the fission.

The fuel rings 2 are piled upon mandrels 3, for example of graphite, provided at their ends with screw thread. On these ends are screwed two supporting nuts 4, which may also be made of graphite. Before the second supporting nut associated with a mandrel is tightened and after all fuel rings to be supported by the mandrels have been arranged at their places, a coating 5 of refractory material, having a diameter slightly smaller than the outer diameter of the supporting nuts is slipped on the assembly.

The mandrels are then stacked on each other with intermediate adjusting rings 6. From the figure it is evident that the supporting nuts have on their outer sides a shoulder so that an adjusting ring is held in place between two adjacent mandrels between the corresponding supporting nuts. The profile of the adjusting rings is such that their width at the center corresponds to the cavity formed by the adjacent nuts of two consecutive mandrels, a collar being formed at the periphery intended to enlarge the surface in a direction of height to a sufficient extent to accommodate shock-absorbing coils 7 of quartz fibre. These coils are wound irregularly and loosely, so that they have a certain amount of elasticity so that they can fulfill the function of a shock-absorber with respect to the quartz sheath.

The structure of the coating 5 is to be designed with respect to the material employed and the choice of this material depends upon the fuel material used. As stated above, it is necessary to prevent these materials from reacting chemically with each other.

It may occur that the coating 5 is to be made from graphite due to the fuel employed. In this case use may be made of perforated graphite so that the concrete total surface is much smaller than the total surface formed by the perforations.

However, in most cases this coating will be made in the form of a grating of a metallic, refractory material for example tungsten, which is chosen on account of its mechanical and physical properties. The meshes of the grating may be formed in any suitable shape provided that their total surface exceeds the surface occupied by the tungsten wires. This tungsten coating is very suitable to hold the fuel rings, for example of uranium- or plutonium carbides, in place.

As stated above, the mandrels are made from graphite. If the fuel material used and the tungsten of the envelope 5 are capable of reacting chemically with the graphite, a film of refractory material, for example thorium oxide is arranged on the mandrel.

What is claimed is:

1. A fuel element for use in a nuclear reactor comprising a sheath containing fissile fuel material therein, said fissile material being in the form of a plurality of individual elements, means in said sheath for supporting and maintaining the individual elements out of contact with said sheath, a coating within said sheath surrounding but spaced from said fissile fuel material, said coating being a perforated refractory material which does not react chemically with the individual elements of fissile fuel material, and said means including elements which hold the outer surface of said coating spaced apart from the inner surface of said sheath and which is only partly in contact with each of said surfaces.

2. A fuel element for use in a nuclear reactor as claimed in claim 1 wherein one of said elements is provided over at least a part of its peripheral surface with coils constituted of quartz fiber.

3. A fuel element for use in a nuclear reactor as claimed in claim 1 wherein said coating is constituted of tungsten.

4. A fuel element for use in a nuclear reactor comprising a sheath containing fissile fuel material therein, said fissile material being in the form of a plurality of individual elements, means in said sheath for supporting and maintaining the individual elements out of contact with said sheath, and a coating surrounding but spaced from said fissile fuel material, said coating being a perforated graphite which does not react chemically with the individual elements of the fissile fuel material, said means including a mandrel, a supporting nut for said mandrel and an intermediate adjusting ring.

5. A fuel element for use in a nuclear reactor comprising a sheath containing a plurality of rings of fissile fuel material therein, a mandrel serving as a central support for said rings of fissile fuel material, means in said sheath for supporting and maintaining the individual rings out of contact with said sheath, and a coating within said sheath surrounding but spaced from said rings of fissile fuel material, said central support and coating being rigidly secured to each other, and said coating being a perforated refractory material which does not react chemically with the individual rings of fissile fuel material.

References Cited by the Examiner

UNITED STATES PATENTS

| 2,728,867 | 12/55 | Wilson | 176—68 X |
| 2,852,460 | 9/58 | Abbott et al. | 176—68 |
| 2,948,517 | 8/60 | Cosner | 176—78 X |
| 2,984,613 | 5/61 | Bassett | 176—68 |
| 2,985,575 | 5/61 | Dennis et al. | 176—43 |
| 3,009,869 | 11/61 | Bassett | 176—68 |
| 3,010,889 | 11/61 | Fortescue et al. | 176—19 |
| 3,039,947 | 6/62 | Fortescue et al. | 176—71 |

FOREIGN PATENTS

| 754,559 | 8/56 | Great Britain. |
| 847,125 | 9/60 | Great Britain. |
| 850,015 | 9/60 | Great Britain. |

OTHER REFERENCES

German application 1,041,177, printed Oct. 16, 1958.

CARL D. QUARFORTH, *Primary Examiner.*

OSCAR R. VERTIZ, REUBEN EPSTEIN, *Examiners.*